(12) United States Patent
Ishiguro et al.

(10) Patent No.: US 7,448,806 B2
(45) Date of Patent: Nov. 11, 2008

(54) ROTATION SUPPORT DEVICE FOR COMPRESSOR PULLEY

(75) Inventors: Hiroshi Ishiguro, Fujisawa (JP); Nobuhiko Miyake, Fujisawa (JP); Yukihiro Akabane, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/920,049

(22) Filed: Aug. 17, 2004

(65) Prior Publication Data

US 2005/0037877 A1 Feb. 17, 2005

Related U.S. Application Data

(63) Continuation of application No. PCT/JP02/13087, filed on Dec. 13, 2002.

(30) Foreign Application Priority Data

Feb. 20, 2002 (JP) .............................. 2002-042583

(51) Int. Cl.
*F16C 19/04* (2006.01)
*F16C 33/58* (2006.01)
*F16H 7/20* (2006.01)

(52) U.S. Cl. .................. 384/417; 384/450; 384/517; 384/516; 474/70; 474/199

(58) Field of Classification Search .............. 474/70, 474/199, 135, 170; 384/13, 55, 516–517; 384/450, 457, 475, 486, 498, 547, 417, 543; 29/898.066, 898.063, 898.068; 508/155, 508/364, 371, 552

See application file for complete search history.

(56) References Cited

U.S. PATENT DOCUMENTS

| | | | | | |
|---|---|---|---|---|---|
| 1,492,672 | A | * | 5/1924 | Brunner | 384/498 |
| 2,142,474 | A | * | 1/1939 | Langhaar | 384/516 |
| 4,664,535 | A | * | 5/1987 | Mottate | 384/55 |
| 5,740,893 | A | * | 4/1998 | Yamamoto | 384/505 |
| 6,020,290 | A | * | 2/2000 | Takata et al. | 508/364 |
| 6,116,786 | A | * | 9/2000 | Takata et al. | 384/516 |
| 6,196,720 | B1 | * | 3/2001 | Nozaki et al. | 384/13 |
| 6,352,961 | B1 | * | 3/2002 | Iso et al. | 508/155 |
| 6,659,649 | B2 | * | 12/2003 | Ishiguro et al. | 384/486 |
| 6,692,393 | B2 | * | 2/2004 | Fukuwaka et al. | 474/199 |

(Continued)

FOREIGN PATENT DOCUMENTS

EP 0869166 A1 * 10/1998

(Continued)

*Primary Examiner*—Marcus Charles
(74) *Attorney, Agent, or Firm*—Katten Muchin Rosenman LLP

(57) ABSTRACT

A rotation support device for a compressor pulley, wherein a three-point contact radial ball bearing (14*b*) is used as a rolling bearing for supporting a driven pulley, the cross sectional shape of an inner ring raceway track (19*b*) coming into contact, at one point, with the rolling contact surface of each ball (17*a*) is formed in a composite arc by smoothly and continuously connecting arcs with different radii of curvature $R_1$ and $R_2$ to each other, and the radius of curvature $R_1$ on a center side in the width direction is made smaller and the radii of curvature $R_2$ on the both end sides in the width direction are made larger ($R_1 < R_2$) whereby the durability of the rolling bearing for supporting the driven pulley can be assured while reducing the size of the rolling bearing.

4 Claims, 8 Drawing Sheets

U.S. PATENT DOCUMENTS 6,793,397 B2 * 9/2004 Ishiguro et al. ............. 384/450

FOREIGN PATENT DOCUMENTS

| | | | | |
|---|---|---|---|---|
| EP | 1217258 A2 | * | 6/2002 |
| GB | 2058243 A | * | 4/1981 |
| JP | 09-119510 | | 5/1997 |
| JP | 11-13750 A | * | 1/1999 |
| JP | 11-61168 A | * | 3/1999 |
| JP | 11-210766 A | * | 9/1999 |
| JP | 11-336795 | | 12/1999 |
| JP | 11344037 A | * | 12/1999 |
| JP | 2000-120668 A | * | 4/2000 |
| JP | 2001-208081 | | 8/2001 |
| JP | 2001-021855 | | 1/2002 |
| SU | 48161 A | * | 12/1975 |
| WO | WO 2004/038242 A1 | * | 5/2004 |

* cited by examiner

ROTATION SUPPORT DEVICE FOR COMPRESSOR PULLEY

CROSS-REFERENCE TO RELATED APPLICATION

The present application is a continuation of International Application No. PCT/JP02/13087 which was filed on Dec. 13, 2002.

TECHNICAL FIELD

The present invention is related to a rotation support device for a compressor pulley for rotationally supporting a follower pulley around a stationary supporting member such as a housing of a compressor in an air-conditioning system of a vehicle, and installed for use in the rotation driving device of this compressor.

BACKGROUND TECHNIQUE

Compressors for use in an air-conditioning system of a vehicle are rotationally driven by a traction engine to compress a refrigerant. For this purpose, an endless belt running around a follower pulley fixed at the end portion of the rotatable shaft of this compressor and a driven pulley fixed at the end portion of a crank shaft for the above traction engine in order to rotationally drive the above rotatable shaft by the rotation of this endless belt.

FIG. 5 is a view showing the rotational driving structure of a rotatable shaft 1 of a compressor. This rotatable shaft 1 is rotationally supported within a casing 2 by a rolling bearing not shown in the figure. A follower pulley 4 is rotationally supported by a double-row radial ball bearing 5 around a supporting cylinder member 3, which is an instance of the supporting member as recited in a claim, the external surface of the end portion of this casing 2. This follower pulley 4 is designed in the form of a circular ring having a horseshoe cross section within whose inner space is arranged a solenoid 6 which is fixed to the end surface of the above casing 2. On the other hand, an attachment bracket 7 is fixed to the end portion of the above rotatable shaft 1 projected from the above casing 2 while an annular plate 8 made of a magnetic material is supported by a sheet spring 9 around this attachment bracket 7. When the above solenoid 6 is not energized, this annular plate 8 is located separate from the above driven pulley 4 by the elasticity of the above board spring 9 as illustrated in FIG. 5. However, when the above solenoid 6 is energized, this annular plate 8 is attracted and stuck to this follower pulley 4 to allow the transmission of a rotation force from this follower pulley 4 to the above rotatable shaft 1. Namely, the above solenoid 6, the above annular plate 8 and the above sheet spring 9 serve as an electromagnetic clutch 10, in combination, for engaging and disengaging the above follower pulley 4 with the above rotatable shaft 1.

In the case of the above structure in which the double-row radial ball bearing 5 is used to rotationally support the follower pulley 4, even when some unbalanced load is applied to this follower pulley 4 from the endless belt 11 (shown with a phantom line) running around this follower pulley 4, there is little possibility of incurring the misalignment (inclination) between the central axis of the outer race 12 and the central axis of the inner race 13 constituting the above double-row radial ball bearing 5. Accordingly, it is possible to assure the durability of the above double-row radial ball bearing 5 and also to avoid the partial wear of the above endless belt 11 by preventing the center of rotation of the above follower pulley 4 from being inclined.

By the use of the above double-row radial ball bearing 5, however, it is inevitable that the dimension is increased in the axial direction. The rotatable supporting structure of the follower pulley 4 has to be located within a limited space in many cases, and therefore it is undesirable that the dimension is increased in the axial direction. In addition to this, the increased dimension in the axial direction results in the increased cost of the respective constituent parts.

It becomes easy to install the rotatable supporting structure in a limited space by making use of a single-row deep groove type radial ball bearing, in place of the double-row radial ball bearing 5 as described above, as a rolling bearing for supporting the above follower pulley 4. However, in the case of a simple single-row deep groove type radial ball bearing, when a moment load is applied to the above follower pulley 4, there is only a small resisting force to prevent the follower pulley 4 from being inclined to increase the degree of misalignment between the central axis of the outer race and the central axis of the inner race constituting the above double-row radial ball bearing. This results not only in an insufficiency in durability of the above radial ball bearing, but also in a substantial partial wear of the endless belt 11 running around the above follower pulley 4.

Taking into consideration the above circumstances, it is proposed in the prior art to use a single-row four-point contact type radial ball bearing, for example, as described in JP Patent Publication Nos. Tokukai Hei 9-119510 and Tokukai Hei 11-336795. Among them, FIGS. 6 and 7 shows the second example of the conventional structures as described in JP Patent Publication No. Tokukai Hei 9-119510.

In the case of the second example of the conventional structures, a single-row four-point contact type radial ball bearing 14 is used to support, around the supporting structure not shown in the figure, a follower pulley 4a formed by bending process, e.g., by pressing a metallic plate and the like process. This radial ball bearing 14 is provided with an outer race 15 and an inner race 16 which are supported to be concentric with each other, and a plurality of balls 17 and 17. While the inner peripheral surface of the outer race 15 is formed with an outer raceway 18 over the entire circumference, the outer peripheral surface of the inner race 16 is formed with an inner raceway 19 over the entire circumference. Each of the respective outer and inner raceways 18 and 19 has a so-called Gothic arch-like cross section in which arcs having curvature radii larger than a ½ of the diameter of the respective balls 17 and 17 intersect at the center position. Accordingly, each of the respective outer and inner raceways 18 and 19 is in contact with the rolling contact surface of each of the respective balls 17 and 17 at two points, so that there are four contact points in total for each of the respective balls 17 and 17.

The four-point contact type radial ball bearing 14 as described above has a higher rigidity against moment loads as compared with conventional single-row deep groove type radial ball bearings, and therefore even when a moment load is applied thereto the central axis of the above outer race 15 is hardly displaced from the central axis of the above inner race 16. Because of this, it is possible to lessen the partial wear of the endless belt 11 (refer to FIG. 5) rinning around the follower pulley 4 as compared with the case where a rotation support device for a compressor pulley is constructed by the use of a conventional single-row deep groove type radial ball bearing. Meanwhile, the above JP Patent Publication No. Tokukai Hei 11-336795 describes a structure in which a four-point contact type radial ball bearing as described above is installed in the rotatable supporting structure of a follower pulley for driving a compressor while an electromagnetic clutch is further provided between this follower pulley and the rotatable shaft of the compressor.

Also in the case of the single-row three-point contact type ball bearing 14a as illustrated in FIG. 8, the rigidity against moment loads is high as compared with conventional single-row deep groove type radial ball bearings, and therefore even when a moment load is applied thereto the central axis of the above outer race 15 is hardly displaced from the central axis of the above inner race 16a. This three-point contact type ball bearing 14a is provided with an inner raceway 19a having an arcuate cross sectional profile with a single curvature radius on the outer peripheral surface of this inner race 16a, and an outer raceway 18 having a Gothic arch-like cross sectional profile and making in contact with the rolling contact surface of the above ball 17 at two points on the inner peripheral surface of the above outer race 15 in the same manner as the four-point contact type radial ball bearing 14 as illustrated in FIG. 7. In the case of this three-point contact type ball bearing 14a for supporting a compressor pulley, it is also possible to lessen the partial wear of the endless belt 11 (refer to FIG. 5) running around the follower pulley 4 as compared with the case where a rotation support device for a compressor pulley is constructed by the use of a conventional single-row deep groove type radial ball bearing. This applies also to a three-point contact type ball bearing in which the rolling contact surface of each ball is in contact respectively with the outer raceway at one point and with the inner raceway at two points in a reverse manner to the structure of FIG. 8.

As mentioned above, when a three-point contact type or a four-point contact type radial ball bearing is used in the rotatable supporting structure of a follower pulley for driving a compressor, there is a possibility of achieving both the reduction of the size and weight thereof and the durability thereof at a higher level. However, in the case of the three-point contact type or four-point contact type radial ball bearings as described above, there may occur the following shortcomings respectively.

First, in the case of the three-point contact type radial ball bearing among these two types, it is desired to decrease the curvature radius of the cross sectional profile of the raceway being in contact with the rolling contact surface of each ball at one point to 0.505 to 0.520 times the diameter (50.5 to 52.0%) of each ball for the purpose of assuring the rigidity against radial loads. However, if the curvature radius is decreased in this manner, it becomes likely that the respective balls ride over the edge of the above raceways so that an excessive surface pressure due to the edge load may be applied to the rolling contact surfaces of the respective balls. As a result, it becomes likely to cause damage such as premature flaking on the rolling contact surfaces of the respective balls.

On the other hand, in the case of the four-point contact type radial ball bearing, the rigidity against moment loads can be assured but then the rotational resistance and the internal heat generation tend to increase due to the larger number of contact points between the raceways and the respective balls. In addition to this, when a heavy moment load is applied, there is a possibility of displacing the above contact points toward the edge in the width direction. Because of the displacement, a micro slip tends to occur at the respective contact points so that internal heat generation and wear may be increased due to the micro slip.

Incidentally, JP Patent Publication No. Tokukai 2001-208081 describes a single-row deep groove type radial ball bearing having a cross sectional profile of each of the inner raceway and the outer raceway in which arcs having different curvature radii are smoothly joined in the form of a composite arc. However, in the case of the single-row deep groove type radial ball bearing as described in this publication, the rolling contact surface of each ball is in contact with each of the inner raceway and the outer raceway at one point, i.e., as a two-point contact type, and therefore the rigidity against moment loads is considered as smaller than that of the three-point contact type or the four-point contact type as described above.

Taking into consideration the above situation, the present invention has been made in order to provide a rotation support device for a compressor pulley having an excellent durability by assuring the rigidity of a radial ball bearing against moment loads, preventing ball from riding over the end edge of the raceway and preventing the rotational resistance and the internal heat generation from increasing.

DISCLOSURE OF THE INVENTION

The rotation support device for a compressor pulley of this invention comprises, in the same manner as the prior art rotation support device for a compressor pulley, a rotatable shaft of a compressor, a stationary supporting member located around this rotatable shaft, a rolling bearing supported by this supporting member, and a pulley rotationally supported around this supporting member by this rolling bearing for having an endless belt run therearound.

Then, as illustrated in FIG. 8, the above rolling bearing is then provided with an inner race having an inner raceway, an outer race having an outer raceway and a plurality of balls rollingly supported between the inner raceway and the outer raceway, such that the outer peripheral surface of the inner raceway is shaped to come in contact with a rolling contact surface of the balls at one or two points and that the inner peripheral surface of the outer raceway is shaped to come in contact with a rolling contact surface of the balls at one or two points, and that one raceway of the inner raceway and the outer raceway is in contact with the rolling contact surface of each ball at two points while the other raceway of the inner raceway and the outer raceway is in contact with the rolling contact surface of each ball at one point to form a single-row three-point contact type radial ball bearing.

Particularly, in the rotation support device for a compressor pulley of this invention, the cross sectional profile of the other raceway being in contact with the rolling contact surface of each ball at one point is a composite arc formed by smoothly joining a plurality of arcs having different curvature radii, in which the curvature radius of the composite arc is small in the center side in the width direction while the curvature radius of the composite arc in the width direction is large near the opposite edges.

Also, more preferably, the curvature radius of the cross sectional profile of the one raceway being in contact with the rolling contact surface of each ball at two points is 0.53 to 0.57 times the diameter of the respective balls while the respective curvature radii of the cross sectional profile of the other raceway being in contact with the rolling contact surface of each ball at one point is 0.505 to 0.560 times the diameter of the respective balls.

Furthermore, the present invention as recited above may be combined with one or more structures of the following structures ①-⑤.

①  With the inner and outer raceways, the groove depth of the one raceway being in contact with the rolling contact surface of each ball at two points is at least 18% of the diameter of the balls.

② The radial ball bearing is filled with a grease made of a composite oil comprising one or more selected from the group of an ether, an ester and a poly-alpha-olefin as a base oil with a thickener of an urea and including as an additive at least ZnDTC (zinc dithiocarbamate which is an extreme pressure additive).

③ At least one of a nitriding treatment and a dimensional stabilization treatment is given to at least one of the inner race and the outer race and balls.

④ Each ball is rollingly supported in a pocket provided in a retainer while the inside dimension of the pocket in the circumferential direction is 1.03 or more times of the diameter of the respective balls.

⑤ The width dimension in cross section of the radial ball bearing is also 1.3 or more times of the diameter in the radial direction of the radial ball bearing.

In accordance with the rotation support device for a compressor pulley of the present invention as constructed above, it is possible to prevent the balls in the radial ball bearing from riding even the end edge of the raceways and to minimize the increase in the rotational resistance and the internal heat generation, while assuring the rigidity of the radial ball bearing against moment loads. Namely, since the above radial ball bearing is of a three-point contact type, the rigidity against moment loads can be easily assured as compared with that of a two-point contact type. Also, in addition to this, it is possible to minimize the increase in the rotational resistance and the internal heat generation as compared with that of a four-point contact type.

Furthermore, the cross sectional profile of the other raceway being in contact with the rolling contact surface of each of the above balls at one point is designed as a composite arc formed by a plurality of smoothly joining arcs having different curvature radii respectively, and in addition to this, the curvature radius in the center side in the width direction is smaller while the curvature radius is larger near the opposite edges in the width direction. For this reason, even when a heavy moment load is applied, the above respective balls hardly ride over the end edges in the width direction of the above other raceway and therefore preventing an excessive surface pressure from being applied to the rolling contact surface. As a result, it is possible to inhibit the inclination of the above follower pulley and the outer race relative to the inner race and assure the rolling contact fatigue life of the above radial ball bearing and the durability of this radial ball bearing. In addition to this, it is also possible to inhibit the partial wear of the endless belt running around the above pulley and assure the durability of this endless belt.

Furthermore, the curvature radius in cross section of the one raceway being in contact with the rolling contact surface of each of the above balls at two points is limited to the range of 0.53 to 0.57 times the diameter of the respective balls while the respective curvature radii in cross section of the other raceway being in contact with the rolling contact surface of each of the above balls at one point is limited to the range of 0.505 to 0.560 times the diameter of the respective balls, and therefore it is possible to maintain the contact condition well in the rolling contact surfaces between the rolling contact surface of each ball and the respective raceways. That is, if the curvature radius in cross section of the above one raceway is smaller than 0.53 time the diameter of the respective balls, or if the respective curvature radii in cross section of the above other raceway are smaller than 0.505 times the diameter of the respective balls, the contact ellipse of the rolling contact surface becomes excessively large so that the rotational resistance and the internal heat generation possibly tends to increase. On the other hand, if the curvature radius in cross section of the above one raceway is larger than 0.57 times the diameter of the respective balls, or if the respective curvature radii in cross section of the above other raceway are larger than 0.560 times the diameter Da of the respective balls, the contact ellipse of the rolling contact surface becomes excessively small so that it becomes likely to cause damage such as premature flaking due to the increase in the contact pressure.

In addition to this, the durability of the above radial ball bearing can be furthermore improved by combining one or more structures of the above structures ①-⑤.

First, by securing the groove depth of the one raceway being in contact with the rolling contact surface of each ball at two points to be no less than 18% of the diameter of the respective balls as described in the ①, it is possible to prevent the rolling contact surface of the respective balls from riding over the end edge of the above one raceway. As a result, it is possible to prevent an excessive surface pressure from being applied to the rolling contact surface of the respective balls, assure the rolling contact fatigue lives of the respective rolling contact surfaces and thereby improve the durability of the above radial ball bearing.

Also, by the use of a grease having the predetermined composition as described in the ②, the life of the grease is elongated to improve the durability of the above radial ball bearing.

Furthermore, if a nitriding treatment or a dimensional stabilization treatment is conducted as described in the ③, it is possible to improve the rolling contact fatigue lives of the elements given the treatment and other elements contacting the elements and therefore improve the durability of the above radial ball bearing.

Still further, by securing the inside dimension of the respective pockets of the retainer as described in the ④, it is possible to prevent each pocket from being strongly pressed by the balls supported by the pocket, avoid the damage on the above retainer and improve the durability of the above radial ball bearing.

Still further, if the width dimension of the cross sectional profile of the radial ball bearing is secured as described the above ⑤, it is possible to increase the volume of the internal space of this radial ball bearing and therefore increase the amount of a grease filled in this internal space. As a result, the durability life of this grease can be elongated to improve the durability of the above radial ball bearing.

BEST MODE FOR CARRYING OUT THE INVENTION

Figure 1:
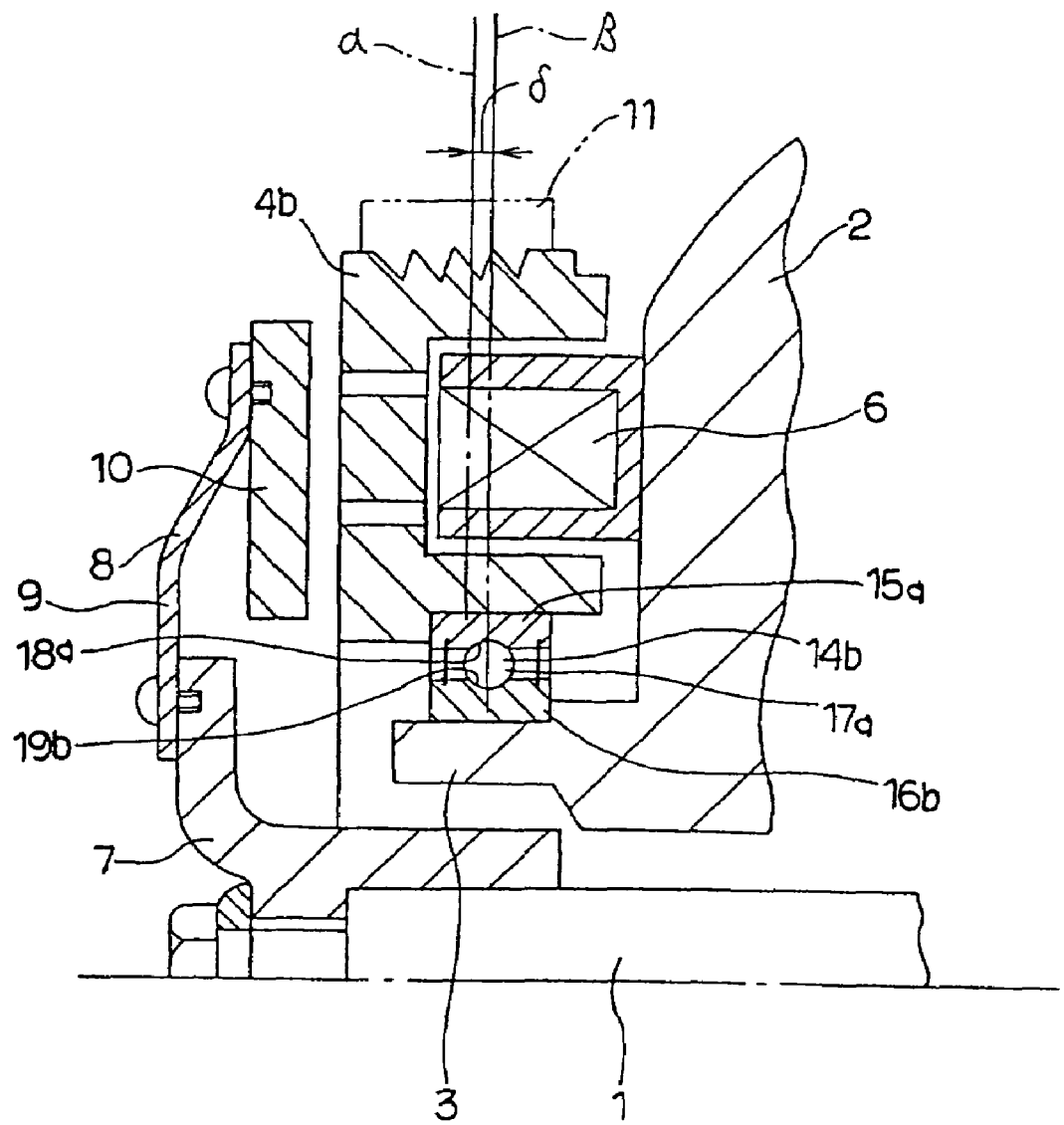
FIG. 1 is a partial sectional view showing a first example of the embodiment of the present invention.
Figure 2:
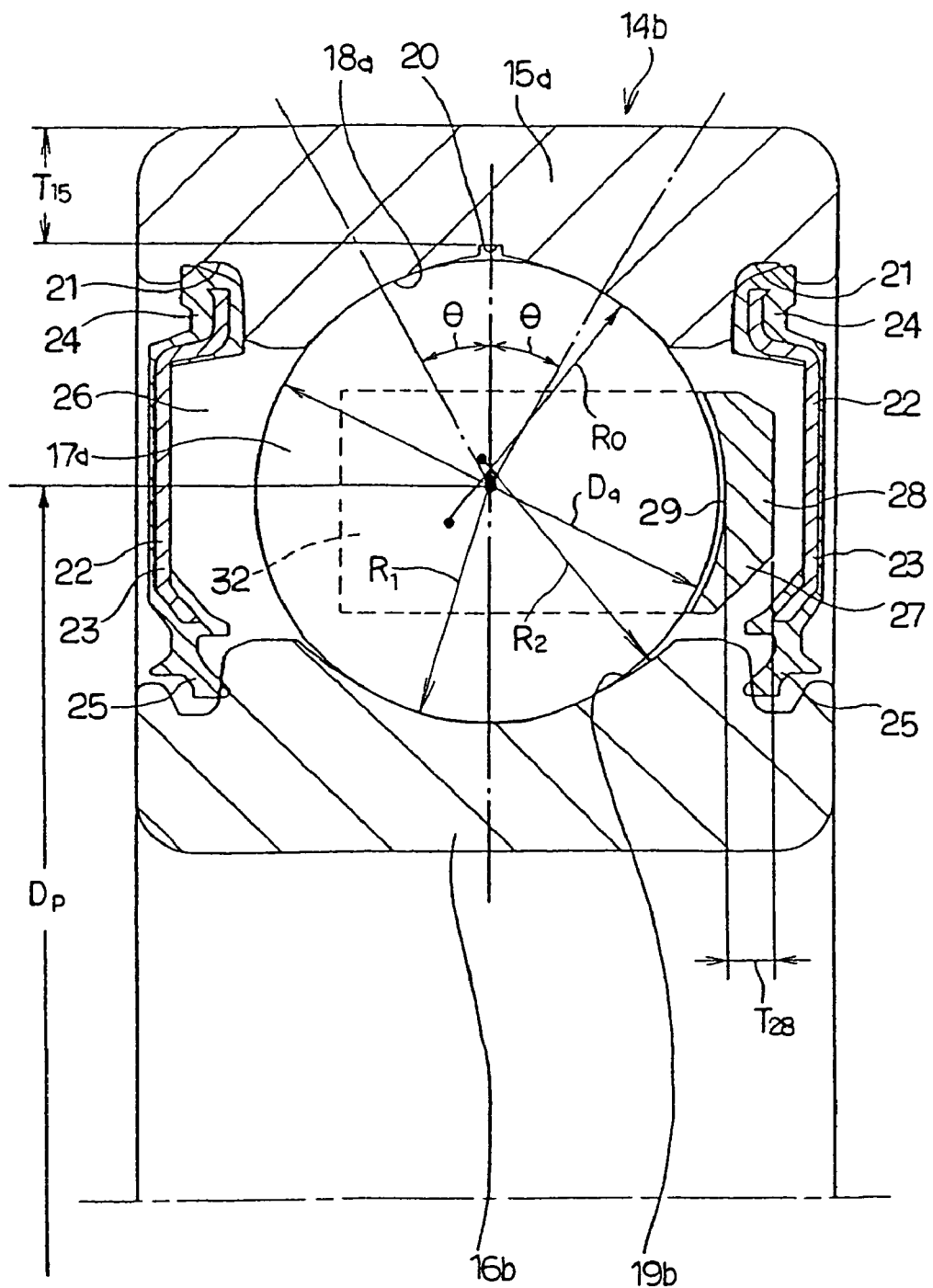
FIG. 2 is a partial enlarged sectional view separately showing a radial ball bearing.
Figure 5:
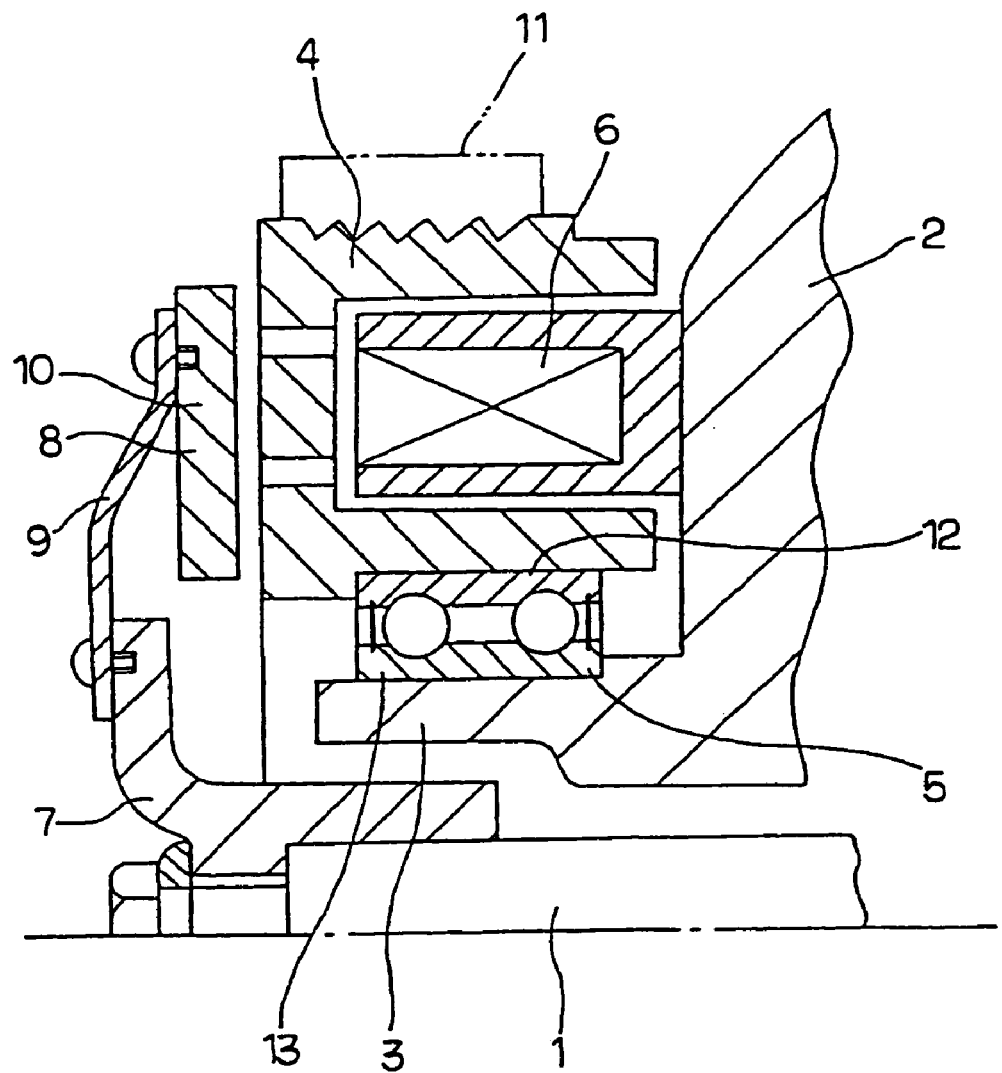
FIG. 5 is a partial sectional view showing a first example of a conventional structure.
Figure 6:
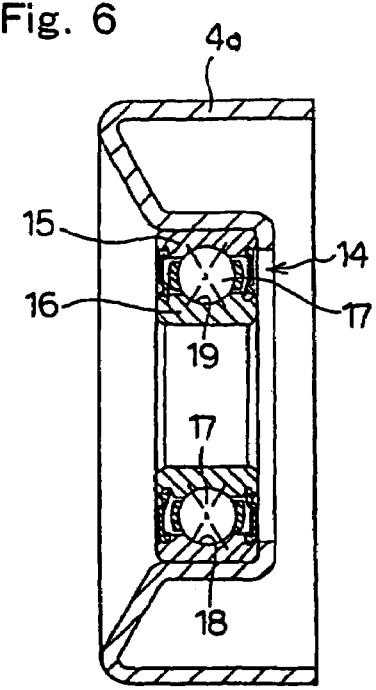
FIG. 6 is a sectional view showing a second example of the conventional structure.

FIGS. 1 and 2 show a first example of the embodiment in accordance with the present invention. The characteristic features of the present invention reside in assuring the durability of a radial ball bearing 14b of a structure which is used as a three-point contact type radial ball bearing 14b for rotationally supporting a follower pulley 4b around a stationary supporting member such as a supporting cylinder member 3 of a casing 2. The structures and the function of the other members are similar to those of the prior art structure as illustrated in FIG. 5, and therefore, while redundant explanation is not repeated or is simplified, the following description is focused on the characteristic structure of this example.

The above described radial ball bearing 14b is provided with an outer race 15a and an inner race 16b which are supported to be concentric with each other, and a plurality of balls 17a. While the inner peripheral surface of the outer race 15a is formed with an outer raceway 18a over the entire circumference, the outer peripheral surface of the inner race 16b is formed with an inner raceway 19b over the entire circumference. With the outer raceway 18a and the inner raceway 19b, the cross sectional profile of the outer raceway 18a, is a so-called Gothic arch-like cross section in which arcs having a curvature radius Ro larger than ½ of the diameter Da of the respective ball 17a and different centers of curvature intersect each other at the center position. Meanwhile, the curvature radius Ro of the above outer raceway 18a is desirably limited to the range of 0.53 to 0.57 times the diameter Da of the respective balls 17a (Ro=0.53 Da to 0.57 Da).

On the other hand, of the above outer raceway 18a and the inner raceway 19b, the cross sectional profile of the inner raceway 19b includes a composite arc formed by smoothly joining arcs having different curvature radii $R_1$ and $R_2$ larger than a ½ of the diameter of the respective balls 17a with different centers of curvature respectively, and in addition to this, the curvature radius $R_1$ in the center side in the width direction is smaller while the curvature radius $R_2$ near the opposite edges in the width direction is larger ($R_1<R_2$). Namely, in the case of this example, the above curvature radius $R_1$ in the center side in the width direction is 0.505 times the diameter Da of the respective balls 17a ($R_1$=0.505 Da) while the curvature radius $R_2$ near the opposite edges in the width direction is 0.560 times the diameter Da ($R_2$=0.560 Da). For example, the respective curvature radii $R_1$ and $R_2$ are preferably limited to the range of 0.505 to 0.560 times the diameter Da of the respective balls 17a ($R_1$=0.505 Da to 0.56 Da and $R_2$=0.505 Da to 0.56 Da).

In the case where the respective elements are designed as described above, the above outer raceway 18a is in contact with the rolling contact surface of each of the respective balls 17a at two points while the above inner raceway 19b is in contact the rolling contact surface of each of the respective balls 17a at one point, so that there are three contact points in total for each of the respective balls 17a. In the case of this example, the rest angle θ is selected to be 20 degrees which represents the differential angle between the center of this outer raceway 18a and the locations of the rolling contact surfaces with which the above outer raceway 18a rollingly engages a respective ball 17a. Also, when the above outer race 15a and the inner race 16b are assembled with a plurality of balls 17a to form the above radial ball bearing 14b, there is a positive or negative radial clearance in this radial ball bearing 14b. The positive radial clearance, even when it exists, is limited to no larger than 0.2% of the diameter Dp of the pitch circle of the above radial ball bearing 14b or no larger than 1.5% of the diameter Da of the respective balls 17a.

Furthermore, the above outer race 15a and the inner race 16b are treated by a high temperature tempering process (annealing process) at 190° C. to 230° C. or 230° C. to 270° C. in accordance with the usage environment for the purpose of improving the rolling contact fatigue lives of the above outer raceway 18a and the inner raceway 19b is improved. Incidentally, when the high temperature tempering process is actually performed, a nominal value is selected as a target temperature, e.g., 200° C., 210° C., 220° C., 240° C., 250° C., 260° C. and the like in the above-mentioned temperature range.

Figure 7:
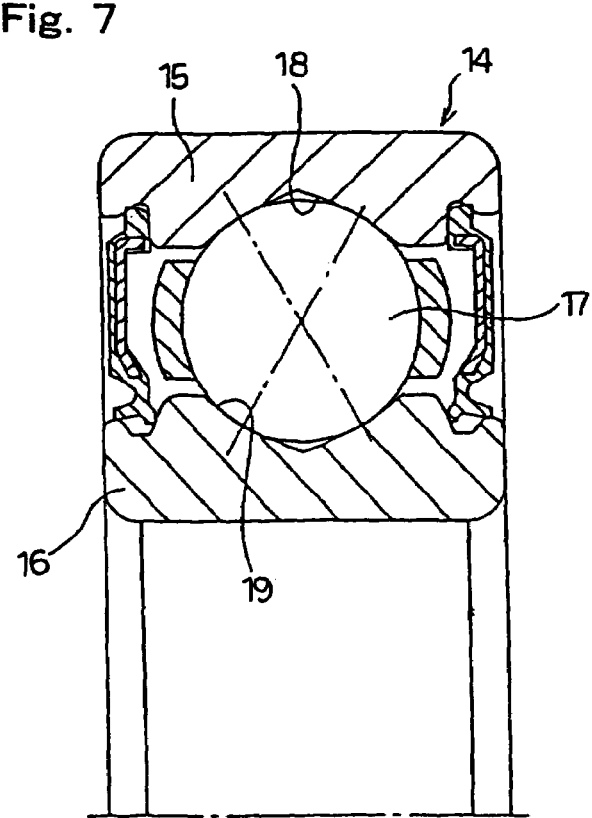
FIG. 7 is a sectional view separately showing a four-point contact type radial ball bearing.
Figure 8:
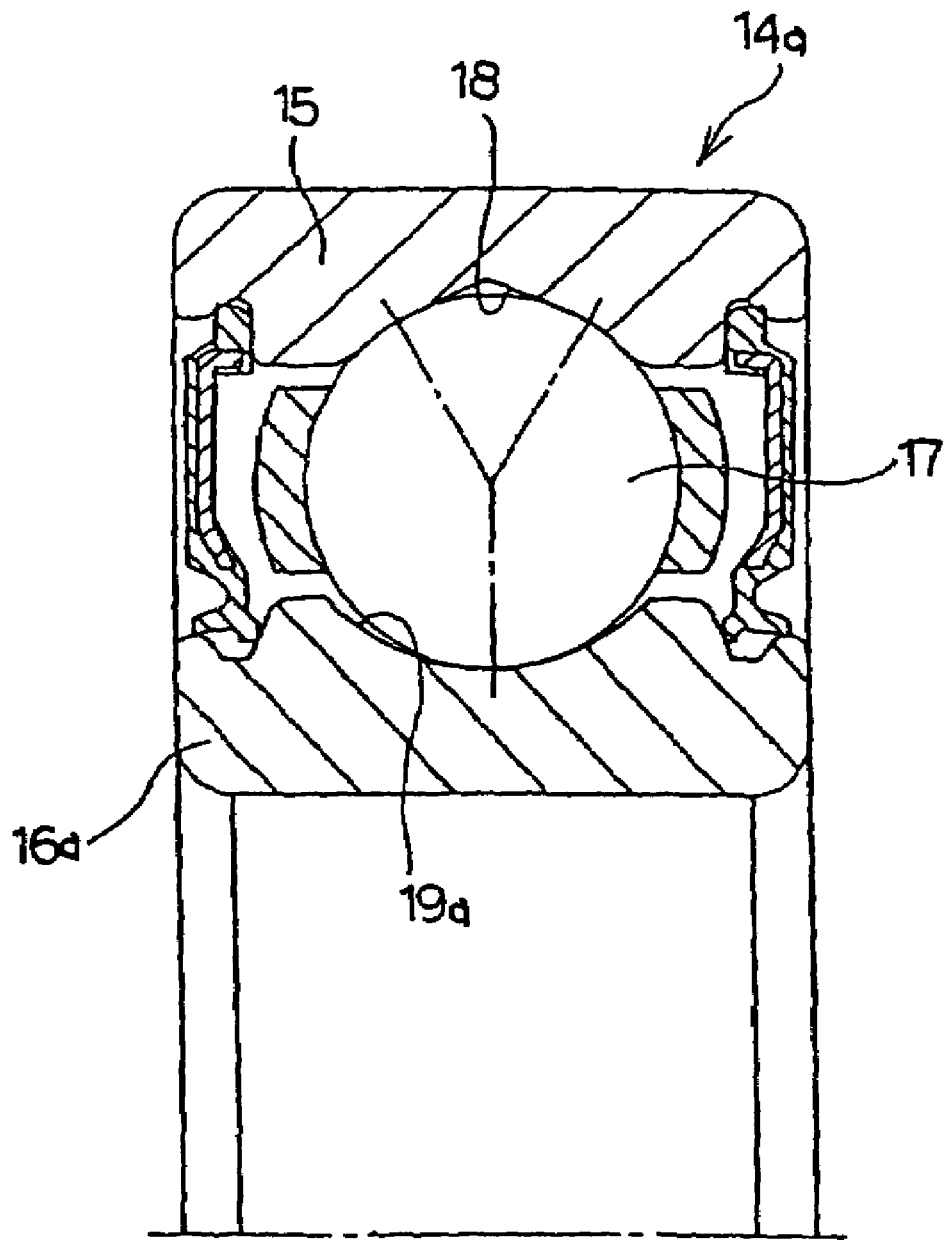
FIG. 8 is a sectional view separately showing a three-point contact type radial ball bearing.

Also, in the case of the example as illustrated, of the above outer raceway 18a and the inner raceway 19b, a relief groove 20 is formed in the center position in the width direction of the outer raceway 18a that is in contact with the rolling contact surface of each of the above balls 17a at two points, for the purpose of avoiding interference with a tool used during machining of this outer raceway 18a. However, the relief groove 20 as described above can be omitted with as in the prior art structure shown in FIG. 7. Anyway, the wall thickness $T_{15}$ of the above outer race 15a at the groove bottom (at the portion with the smallest wall thickness in the center of the outer raceway 18a) is at least 20% of the diameter Da of the respective balls 17a as described above, preferably 20% to 40% of Da $\{T_{15}=(0.2 \text{ to } 0.4)Da\}$. In the case where the above relief groove 20 is formed, the above wall thickness $T_{15}$ is equal to the distance between the bottom of this relief groove 20 and the outer peripheral surface of the above outer race 15a. By limiting the above wall thickness $T_{15}$ to the above range, it is possible to prevent the outer diameter of the above radial ball bearing 14b from unnecessarily increasing and to assure the strength of this outer race 15a while avoiding growth in size of the radial ball bearing 14b with the above outer race 15a.

Figure 3:
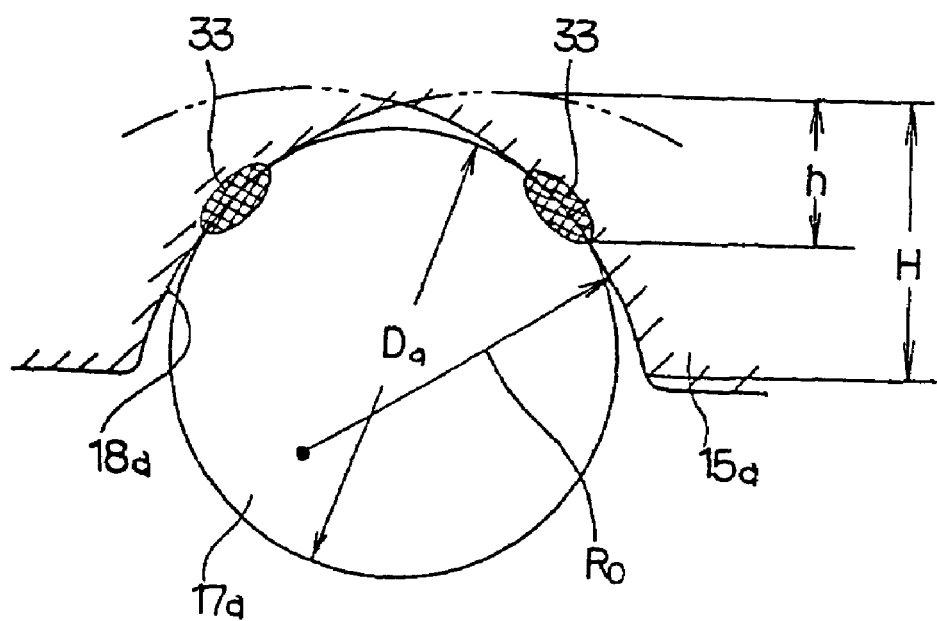
FIG. 3 is a partial sectional view showing a raceway with which the concept of a groove depth is explained.

Also, of the above outer raceway 18a and the inner raceway 19b, the dimension of the groove depth of the outer raceway 18a, that is in contact with the rolling contact surface of each of the above balls 17a at two points, is preferred to be at least 18% of the diameter Da of the respective balls 17a. Incidentally, the dimension of the groove depth of the outer raceway 18a is equal to the distance H from the bottom of the curve having the above curvature radius Ro to the edge of the above outer raceway 18a (if a chamfer exists, to the edge of the chamfer) as illustrated in FIG. 3. By selecting the groove depth H, as defined in this manner, to be at least 18% of the diameter Da of the respective balls 17a, it is possible to prevent the rolling contact surface of the respective balls 17a from riding over the end edge of the above outer raceway 18a. Consequently, it is possible to prevent an excessive surface pressure due to the edge load from being applied to the rolling contact surface of the respective balls 17a, to assure the rolling contact fatigue lives of the respective rolling contact surfaces and thereby improve the durability of the above radial ball bearing 14b. The reason of this will be explained with reference to FIG. 3.

A pair of contact ellipses 33 and 33 exist, as well known, in the vicinity of the contact points between the rolling contact surface of each ball 17a and the above outer raceway 18a and in the left and right sides of this outer raceway 18a (the left and right direction is considered in relation to FIG. 3). The sizes of the respective contact ellipses 33 and 33 change depending on the radial load and the moment load applied to the above radial ball bearing 14b. When a moment load is applied, the above-described pair of the left and right contact ellipses 33 and 33 become different in size. Anyway, an excessive surface pressure is not applied to the rolling contact surface of the respective balls 17a as long as the whole contact ellipses 33 and 33 fall within the above outer raceway 18a, however, an excessive surface pressure due to the edge load is applied to the rolling contact surface if either contact ellipse 33 derails the above outer raceway 18a (more exactly speaking, although no contact ellipse is defined when derailing, the term "contact ellipse" is used also in the case where the contact point reaches the end edge for the sake of explanation). Accordingly, in order to assure the rolling contact fatigue lives of the rolling contact surfaces of the respective balls 17a and improve the durability of the above radial ball bearing 14b, it is necessary to prevent the contact ellipses 33 from derailing the above outer raceway 18a or, in other words, from reaching the end edge of the raceway 18a.

Then, the inventors of the present invention conducted experiments for determining the relationship between the effective radial clearance and the height of the contact ellipses 33 and 33 (refer to FIG. 3) by using a four-point contact type radial ball bearing which was driven under the application of a moment load, though not equivalent to the three-point contact type radial ball bearing 14b in accordance with this example. From the results of the experiments, it was confirmed that the maximum ratio of the height h of the contact ellipse 33 to the diameter Da of the respective balls 17a was 18% in the case where the effective radial clearance of the above four-point contact type radial ball bearing was 0.020 mm (the maximum value of the effective radial clearance of the four-point contact type radial ball bearing used in the temperature environment at −40° C. to 160° C.).

From this fact, as described in the above ①, of the above outer raceway 18a and the inner raceway 19b, it is possible to prevent the rolling contact surfaces of the respective balls 17a from riding over the end edge of the above outer raceway 18a by securing at least 18% of the diameter Da of the respective balls 17a for the dimension of the groove depth H of the outer raceway 18a, that is in contact with the rolling contact surface of each of the above balls 17a at two points. If this riding is avoided, it is possible to prevent an excessive surface pressure from being applied to the rolling contact surface of the respective balls 17a, to assure the rolling contact fatigue lives of the respective rolling contact surfaces and thereby to improve the durability of the above radial ball bearing 14b. Incidentally, taking into consideration the work of assembling such as installing the balls 17a between the above outer raceway 18a and the above inner raceway 19b, the maximum ratio (H/Da) of the groove depth H to the diameter Da of the respective balls 17a is preferably 40% or less.

Moreover, as shown in FIG. 2, seal rings 22 and 22 engage, at their outer peripheral edges, respectively with locking grooves 21 and 21 of the inner peripheral surface of the above outer race 15a at the opposite ends thereof. The respective seal rings 22 and 22 are formed respectively of a resilient member 24 which is reinforced with a core metal 23 so that the outer peripheral edge of this resilient member 24 resiliently engages the respective locking grooves 21 and 21. In this condition, the distal edge portion of each seal lip 25 provided at the inner peripheral edge portion of this resilient member 24 is let slidably contact part of the above inner race 16b over the entire circumference in order to closely seal both the opposite openings of the inner space 26 in which the respective balls 17a are placed. Incidentally, the above resilient member 24 forming the respective seal rings 22 and 22 is preferably made of a nitrile rubber or an acrylic rubber.

Then, the above inner space 26 shielded in this manner from the external space is filled with an ether base grease (not shown in the figure) having a viscosity of 70 to 90 mm$^2$/s(cst), preferably, 77 to 82 mm$^2$/s, at an atmospheric temperature of 40° C., as described in the above ②. This grease is preferably made of a composite oil comprising an ether as a base oil with a thickener of an urea such as diurea and including at least ZnDTC as an additive. This type of grease serves to form an effective oil film on the rolling contact section between the rolling contact surfaces of the above respective balls 17a and the above respective raceways 18a and 19b to make a contribution to the assuring of the rolling contact fatigue lives of the respective the raceways 18a and 19b. That is, if generation of heat inside of the above radial ball bearing 14b becomes significant because of the operation under a substantial moment load and so forth, the life of the grease in the above internal space 26 is shortened due to thermal degradation. Since the grease having the above composition has an excellent heat resistance, the life is little shortened even with a temperature rise in the above internal space 26, and therefore the use of the grease can make a contribution to the assuring of the rolling contact fatigue life of the above radial ball bearing 14b. Incidentally, besides those having the composition as described above, ester base and poly-α-olefin base composite oils are suitable for use as a base oil of the grease to be inserted into the above internal space 26.

Also, in the case of this example, the respective balls 17a are rollingly supported by a retainer 27 of the crown type. This retainer 27 is formed in a body by injection moulding a synthetic resin such as a polyamid resin, a poly-phenylene-sulfide resin and the like containing glass fibers in an amount of 5 weight % to 35 weight % (preferably 10 weight % to 25 weight %) as a reinforcement member. The thickness of the bottom portion of this retainer 27, i.e., the thickness $T_{28}$ of the most thin portion of the annular rim 28 corresponding to the deepest area of a pocket 29 is 10% to 40% {$T_{28}$=(0.1 to 0.4)Da} of the diameter Da of the above respective balls 17a. By limiting the geometries of the above retainer 27 in this manner, it is possible to inhibit this retainer 27 from increasing in the axial dimension, assure the strength of this retainer 27, and suppress the elastic deformation of this retainer 27 to a tolerable degree from the practical view point irrespective of the centrifugal force applied during the high speed rotation of the above follower pulley 4b.

Moreover, as described in the above ④, the inside dimension of each pocket 29 in the circumferential direction of the above retainer 27 (the direction normal to the papers of FIGS. 1 and 2) is at least 1.03 times of the diameter Da of the respective balls 17a. By securing the inside dimension of the respective pockets 29 of the above retainer 27 in this manner, it is possible to prevent each pocket 29 from being strongly pressed by the balls 17a supported by the pocket 29, to avoid the damage on the above retainer 27 and to improve the durability of the above radial ball bearing 14b.

Namely, while the above retainer 27 rotates in association with the orbital motion of the above respective balls 17a, the orbital speeds of the respective balls 17a depend on the contact angle with the above outer raceway 18a and the inner raceway 19b. On the other hand, when the above radial ball bearing 14b rotates under a moment load applied thereto, the contact angle of each ball 17a slightly changes in regard to the circumferential direction of the above outer raceway 18a and the inner raceway 19b. As a result, the orbital speeds of the above respective balls 17a become uneven in the circumferential direction. In other words, the orbital speed is increased or decreased in a subtle manner depending upon the phase in the circumferential direction. Consequently, the positions of the above respective balls 17a in relation to the circumferential direction are displaced from the positions (hereinbelow called as "regular positions") in a subtle manner to be taken on the assumption that the respective balls 17a revolves uniformly (without variation of the orbital speeds in regard to the circumferential direction). Namely, if the rolling contact surfaces of the above respective balls 17a are located close to the inner surfaces of the above respective pockets 29, a ball 17a revolving at a higher speed pushes the front inner surface of the corresponding pocket 29 in the orbital direction while a ball 17a revolving at a lower speed pushes the rear inner surface thereof. Consequently, large forces are alternately applied to a craw member 32 (refer to FIG. 2) located between the pockets 29 adjacent to one another in the circumferential direction so that the durability of the above retainer 27 including this craw member 32 is deteriorated.

Contrary to this, if the inside dimension of each pocket 29 in the peripheral direction of the respective pocket 29 is at least 1.03 times the diameter Da of the above respective balls 17a as described above, it is possible to prevent the balls 17a supported in the respective pocket 29 from strongly being pushed against the inner surfaces of the respective pocket 29. Incidentally, in the case where the above inside dimension is 1.03 times the diameter Da of the above respective balls 17a, although the rolling contact surfaces of the respective balls 17a may be pushed against the inner surfaces of the respective pocket 29, the pushing force is very weak and can be sufficiently absorbed by a tolerable elastic deformation of the above craw member 32. Furthermore, in the case where the above inside dimension is at least 1.035 times the diameter Da of the above respective balls 17a, it is possible to effectively prevent the rolling contact surfaces of the respective balls 17a from being pushed against the inner surfaces of the respective pocket 29.

Incidentally, for the purpose of increasing the inside dimension of the respective pockets 29 in the circumferential direction of the above retainer 27, the size of the entire inner diameter of the respective pockets 29 are increased, or alternatively the respective pockets 29 are designed as oblong circles elongated in the circumferential direction. Anyway, the maximum value of the inside dimension in the circumferential direction is limited in accordance with the relationship with the diameter Da of the above respective balls 17a and taking into consideration the entire strength of the above retainer 27. Generally speaking, the maximum value of the above inside dimension is limited up to 1.1 times this diameter Da, preferably up to 1.05 times. Incidentally, the technique of improving the durability of the retainer by increasing the inside dimension of the respective pocket 29 is applicable not only to the retainer of the crown type as illustrated but also to a machined retainer having rims at the both end in. the axial direction.

The radial ball bearing 14b having the structure as described above is inserted between the inner peripheral surface of the above follower pulley 4b and the supporting cylinder member 3 of the above casing 2 as illustrated in FIG. 1 to form the rotation support device for a compressor pulley in accordance with the present invention. In the case where a rotation support device for a compressor pulley is constructed in this manner, as illustrated in FIG. 1, there is provided a displacement d (an offset amount) in the axial direction (the lateral direction in FIG. 1) between the center position in the width direction (the chained line α in FIG. 1) of the endless belt 11 extending around the outer peripheral surface of the above follower pulley 4b and the center position in the width direction of the above radial ball bearing 14b (the center position of the ball 17a indicated with the chained line β in FIG. 1). Particularly, the durability of the above radial ball bearing 14b can be assured by selecting this offset amount δ up to 40% (0.4Dp≧δ) of the diameter Dp (refer to FIG. 2) of the pitch circle of the above radial ball bearing 14b, preferably, up to 20% (0.2Dp≧δ), and furthermore preferably, up to 10% (0.1Dp≧δ).

That is, when driving the rotation support device for a compressor pulley as described above, a moment load proportional to the above offset amount d is applied to the above radial ball bearing 14b through the above follower pulley 4b according to the tension of the above endless belt 11. The central axis of the inner race 16b and the central axis of the outer race 15a constituting this radial ball bearing 14b in combination tends to be misaligned (inclined) from each other. However, even in this case, the moment load applied to the above outer race 15a through the above follower pulley 4b can be minimized by limiting the offset amount d as described above. As a result, it is possible to inhibit the displacement between the central axis of the inner race 16b and the central axis of the outer race 15a which are elements of this radial ball bearing 14b, while inhibiting the increase in the rotational resistance of the above radial ball bearing 14b.

In addition to this, in accordance with this embodiment as described above, the above radial ball bearing 14b installed in the rotation support device for a compressor pulley is of a three-point contact type, and therefore it is possible to minimize the increase in the rotational resistance and the internal heat generation, while assuring the rigidity of the radial ball bearing against moment loads. Namely, since the above radial ball bearing is of a three-point contact type, the rigidity against moment loads can be easily assured as compared with that of a two-point contact type. Also, in addition to this, it is possible to minimize the increase in the rotational resistance and the internal heat generation as compared with that of a four-point contact type.

Furthermore, the cross sectional profile of the inner raceway 19b being in contact with the rolling contact surface of each of the above balls 17a at one point is designed as a composite arc formed by a plurality of smoothly joining arcs having different curvature radii $R_1$ and $R_2$, and in addition to this, the curvature radius $R_1$ in the center side in the width direction is smaller while the curvature radius $R_2$ near the opposite edges in the width direction is larger. For this reason, even when a heavy moment load is applied, the above respective balls 17a hardly ride over the end edges in the width direction of the above inner raceway 19b and therefore preventing an excessive surface pressure from being applied to the rolling contact surface. As a result, it is possible to inhibit the inclination of the above follower pulley 4b and the outer race 15a relative to the inner race 16b and assure the rolling contact fatigue life of the above radial ball bearing 14b and the durability of this radial ball bearing 14b. In addition to this, it is also possible to inhibit the partial wear of the endless belt 11 running around the above follower pulley 4b and to assure the durability of this endless belt 11.

Furthermore, the curvature radius Ro of the above outer raceway 18a is limited to the range of 0.53 to 0.57 times the diameter Da of the respective balls (Ro=0.53 Da to 0.57 Da) while the respective curvature radii $R_1$ and $R_2$ of the cross sectional profile of the above inner raceway 19b are limited to the range of 0.505 to 0.560 times the diameter Da of the respective balls 17a ($R_1$=0.505 Da to 0.560 Da and $R_2$=0.505 Da to 0.560 Da), and therefore it is possible to maintain the contact condition of the rolling contact section between the rolling contact surface of each ball 17a and the rolling contact surface of each of the raceways 18a and 19b.

That is, if the curvature radius Ro of the cross sectional profile of the above outer raceway 18a is smaller than 0.53 times the diameter Da of the respective balls, or if the respective curvature radii $R_1$ and $R_2$ of the cross sectional profile of the above inner raceway 19b are smaller than 0.505 times the diameter Da of the respective balls 17a, the contact ellipse of the rolling contact section becomes excessively large so that the rotational resistance and the internal heat generation possibly tends to increase. On the other hand, if the curvature radius Ro of the cross sectional profile of the above outer raceway 18a is larger than 0.57 times the diameter Da of the respective balls, or if the respective curvature radii $R_1$ and $R_2$ of the cross sectional profile of the above inner raceway 19b are larger than 0.560 times the diameter Da of the respective balls 17a, the contact ellipse of the rolling contact section becomes excessively small so that it becomes likely to cause damage such as premature flaking due to the increase in the contact pressure.

Figure 9:
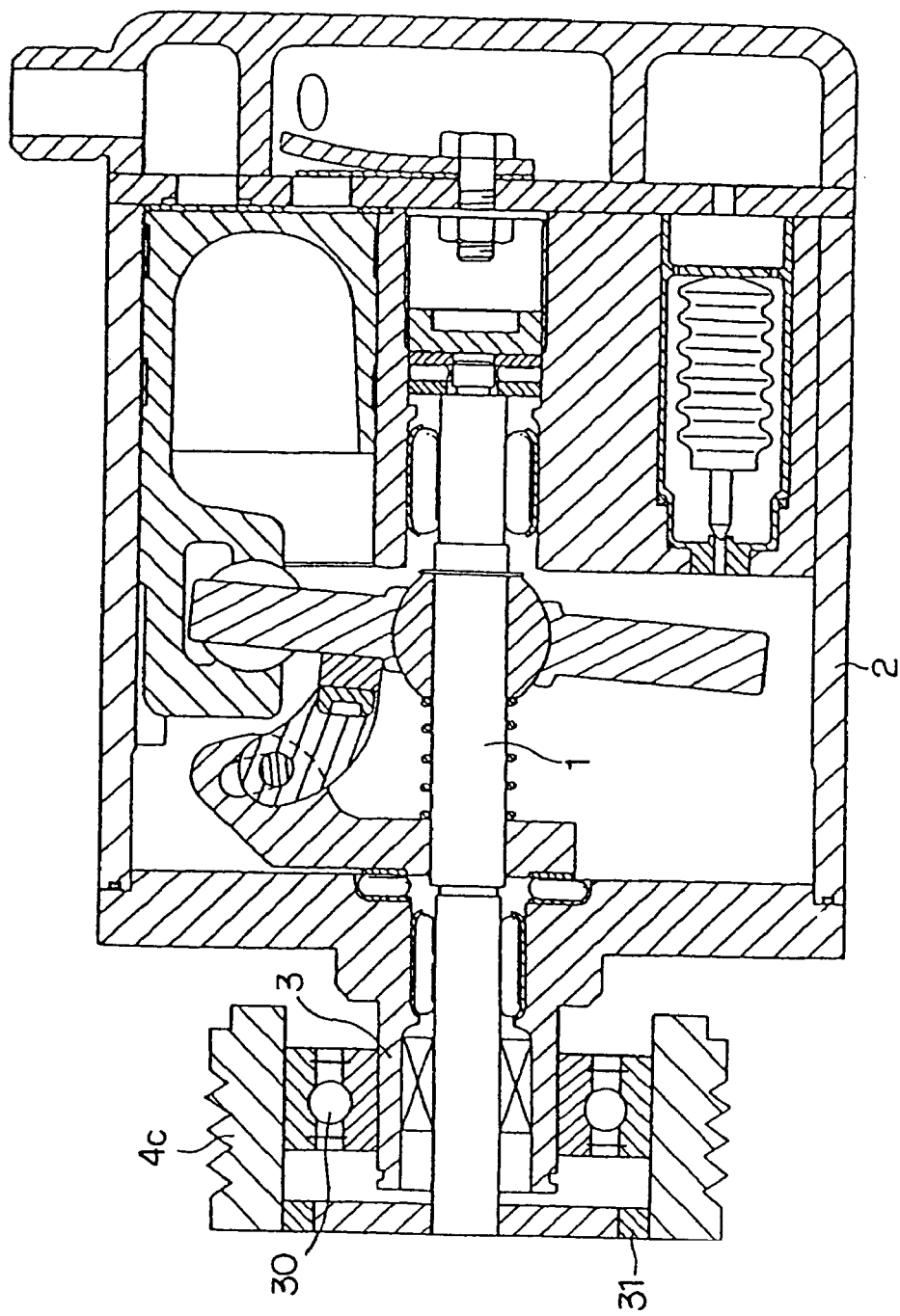
FIG. 9 is a sectional view showing another exemplary structure to which the present invention is applicable.

Incidentally, while the above explanation is applicable to the structure with an electromagnetic clutch for engaging and disengaging a pulley with a rotatable shaft, the present invention is applicable also to a structure without an electromagnetic clutch as long as the structure serves to transmit a rotation force from a pulley to a rotatable shaft. That is, in the case of an variable displacement swash plate compressor for example as described in JP Patent Publication No. Tokukai Hei 11-210619 or JP Utility Model Publication No. Sho 64-27482, the rotating torque of the rotatable shaft of the compressor can be significantly small by setting a very small gradient angle of the swash plate (or by setting the gradient angle to zero). In the case of such a structure, as illustrated in FIG. 9, the electromagnetic clutch may be dispensed with by linking a rotatable shaft 1 with a follower pulley 4c rotationally supported through a roller bearing 30 around a supporting cylinder member 3 formed at the end portion of a casing 2 to allow the transmission of a rotation force through a buffer member 31 serving as a torque tube unless an excessive torque is not applied. Needless to say, by making use of the three-point contact type radial ball bearing 14b according to this example illustrated in FIG. 2 as the above roller bearing 30 in this structure, the effects and advantages are obtained in accordance with the present invention.

Also, in the case where at least one member of the inner race 16b, the outer race 15a and the balls 17a is made of an iron base metallic material such as a carbon steel, a bearing steel, a stainless steel and the like, it is desirable, from the view point of assuring the durability of the above radial ball bearing 14b, to give at least one of a nitriding treatment and a dimensional stabilization treatment to at least one of the inner race 16b, outer race 15a and balls 17a as described in the above ③. That is, when this radial ball bearing 14b which is a single-row ball bearing is driven under an offset load (under a moment load), the surface pressure at the contact portion between the rolling contact surface of each ball 17a and each of the above inner raceway 19b and the outer raceway 18a becomes high. If the elastic deformation due to this surface pressure increases, the rolling contact fatigue life of the corresponding member is shortened so that the durability of the above radial ball bearing 14b is degraded, and for this reason the above nitriding treatment is given in order to improve the surface hardness of the corresponding member, suppress the above elastic deformation and inhibit the wear. Also, when driving under the above offset load, the amount of heat generation increases so that the dimensions of the respective constituent members of the above radial ball bearing 14b tend to change, and for this reason the above dimensional stabilization treatment is given to inhibit the dimension changes irrespective of the above heat generation.

Of the above treatments, the nitriding treatment is a solution treatment of C and N by which the surface hardness increases after the treatment. Accordingly, nitrided layers having a high degree of hardness are formed on the surfaces of the above inner race 16b, the above outer race 15a and the above respective balls 17a by the nitriding treatment. Meanwhile, in regard to the above inner race 16b and the outer race 15a, as long as nitrided layers are formed on the above inner raceway 19b and the outer raceway 18a, the other portions are not necessarily nitrided. However, since it is troublesome to form the nitrided layers only on the inner raceway 19b and the outer raceway 18a, it is desirable in practice to form nitrided layers on the entire surfaces of the above inner race 16b and the outer race 15a. Incidentally, the elastic deformation due to the above surface pressure does not equally appears in the above inner race 16b, the outer race 15a and the balls 17a but the degree of deformation depends on the profile and the material. For example, the outer raceway 18a and the inner raceway 19b are easily elastically deformed while the balls 17a are not easily elastically deformed in the case where they are made of the same material. Accordingly, while it is preferred to give the above nitriding treatment to all the members, only some members such as only the above inner race 16b and the outer race 15a are treated depending upon the material, the size, the profile and the like.

Meanwhile, the above dimensional stabilization treatment is a thermal treatment used for the purpose of decreasing the remained austenite amount $\gamma_R$ and, for example, conducted by gradually cooling the material of the above inner race 16b and the outer race 15a to decrease the remained austenite amount $\gamma_R$ to 6% or lower by volume after the above treatment. By giving the dimensional stabilization treatment in this manner, even if the temperatures of the respective members rise, the dimensions and profile of the respective members are prevented from substantially changing from those as predetermined while the geometries of the above radial ball bearing 14b are also prevented from substantially changing from those as predetermined, and therefore it is possible to improve the durability of this ball bearing 14b.

Furthermore, not shown in the figure, if the dimension of the cross sectional profile of the radial ball bearing 14b in the lateral direction is 1.3 or more times the height of the same cross sectional profile in the radial direction as described the above ⑤, it is possible to increase the volume of the internal space of this radial ball bearing and therefore increase the amount of grease inserted in this internal space. Then, as a result, the durability life of this grease is elongated to improve the durability of the above radial ball bearing 14b.

Figure 4:
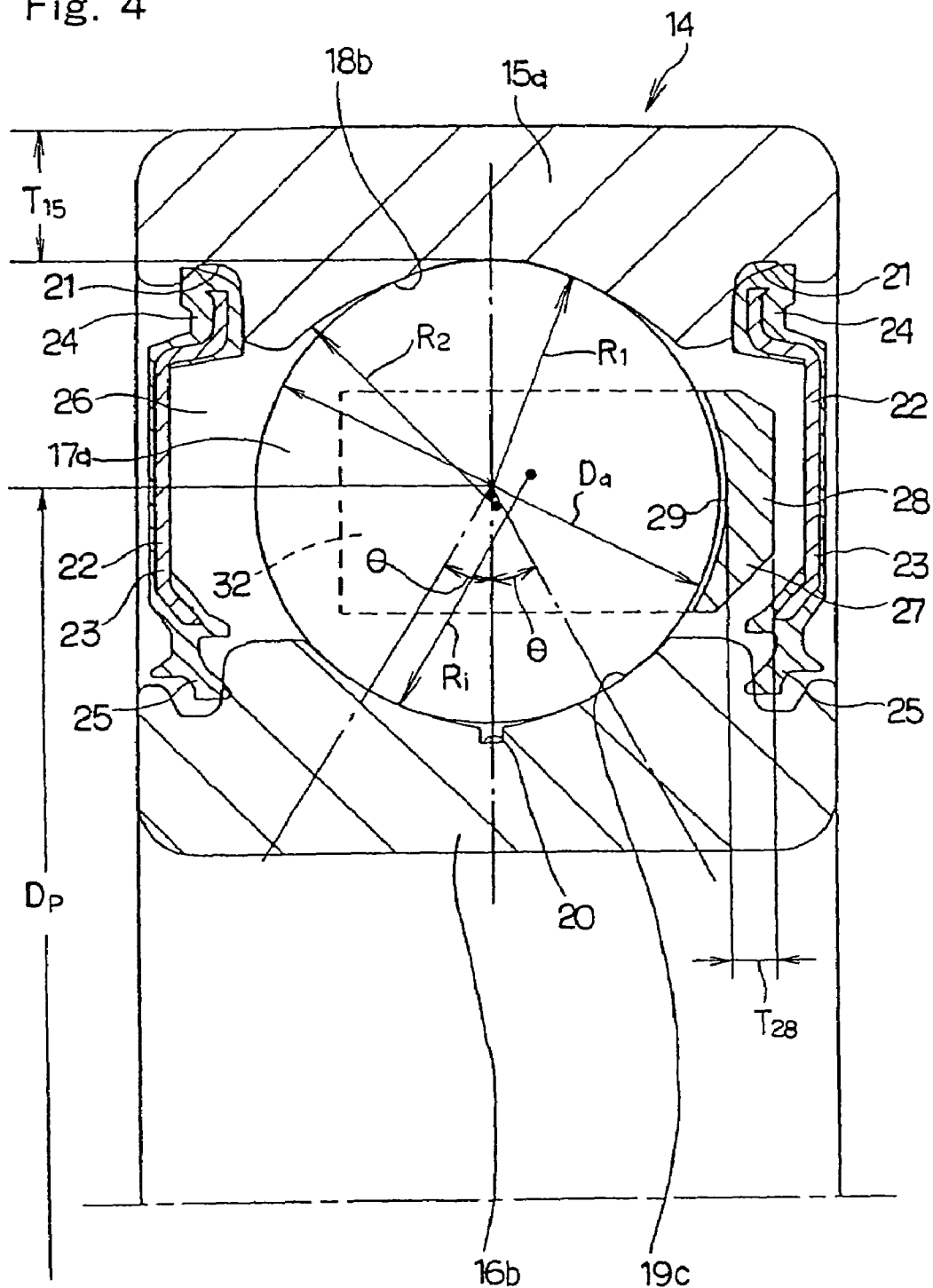
FIG. 4 is a partial sectional view showing a second example of the embodiment of the present invention in the same manner as FIG. 2.

Next, FIG. 4 shows a second example of the embodiment in accordance with the present invention. While the first example of the embodiment as described above is applicable to a three-point contact type radial ball bearing in which the rolling contact surface of each of the balls 17a and the inner raceway 19b (refer to FIG. 4) at one point, this example is applicable to a three-point contact type radial ball bearing in which the rolling contact surface of each of the balls 17a and the outer raceway 18b at one point.

That is, of the outer raceway 18b and the inner raceway 19c, the cross sectional profile of the inner raceway 19c is a so-called Gothic arch-like cross section in which arcs having a curvature radius Ri larger than a ½ of the diameter Da of the respective ball 17a and different centers of curvature intersect at the middle portion. On the other hand, the cross sectional profile of the outer raceway 18b, includes a composite arc formed by smoothly joining arcs having different curvature radii $R_1$ and $R_2$ larger than a ½ of the diameter of the respective balls 17a, and in addition to this, the curvature radius $R_1$ in the center side in the width direction is smaller while the curvature radius $R_2$ near the opposite edges in the width direction is larger ($R_1 < R_2$). Meanwhile, in the case of this example, the above curvature radius $R_1$ in the center side in the width direction is 0.505 times the diameter Da of the respective balls 17a ($R_1$=0.505 Da) while the curvature radius $R_2$ near the opposite edges in the width direction is 0.560 times the diameter Da ($R_2$=0.560 Da). The structures and the function of the other members are similar to those of the first example as described above, and therefore redundant explanation is omitted.

PRACTICAL INDUSTRIAL APPLICABILITY

With the rotation support device for a compressor pulley in accordance with the present invention, which is constructed and operated as mentioned above, it is possible to secure the tolerable moment load and to suppress heat generation and wear during operation without increasing the dimension in the axial direction. For this reason, the present invention contributes to downsizing and improving the performance of a variety of mechanical devices such as compressors for use in an air-conditioning system of a vehicle, e.g., by increasing the life of the rolling bearing installed in the above rotation support device for a compressor pulley and the life of an endless belt extending around a pulley supported by this rolling bearing.

What is claimed is:

1. A rotation support device for a compressor pulley comprising:
   a rotatable shaft of a compressor;
   a stationary supporting member located round the rotatable shaft;
   a rolling bearing supported by the supporting member; and
   the pulley rotationally supported around the supporting member by the rolling bearing for entraining an endless belt therearound;
   the rolling bearing being provided with one of
      a first combination of an inner race having an inner raceway whose outer peripheral surface is shaped to come in contact with a rolling contact surface of a ball at one point and an outer race having an outer raceway whose inner peripheral surface is shaped to come in contact with the rolling contact surface of the ball at two points, and
      a second combination of an inner race having an inner raceway whose outer peripheral surface is shaped to come in contact with a rolling contact surface of a ball at two points and an outer race having an outer raceway whose inner peripheral surface is shaped to come in contact with the rolling contact surface of the ball at one point,
   the ball rollingly supported between the inner raceway and the outer raceway,
   the rolling bearing being a single-row three-point contact type radial ball bearing, wherein the cross sectional profile of the inner raceway other outer raceway which is in contact with the rolling contact surface of the ball at one point is formed in a composite arc by smoothly joining a plurality of arcs having different curvature radii in order that the curvature radius of the composite arc is small in the center side in the width direction while the curvature radius of the composite arc in the width direction is large near the opposite edges; and
   wherein a groove depth of one of the inner raceway and the outer raceway which is in contact with the rolling constant surface of the ball at two points is 18% to 40% of a diameter of the ball, and
   an offset amount in the axial direction between the center in the position in the width direction of the endless belt and the center position in the width direction of the radial ball bearing is up to 40% of the diameter of a pitch circle of the radial ball bearing.

2. The rotation support device for a compressor pulley as claimed in claim 1 wherein the curvature radius of the cross sectional profile of the inner raceway or outer raceway which is in contact with the rolling contact surface of the ball at two points is 0.53 to 0.57 times the diameter of the respective ball while the curvature radius of the cross sectional profile of one of the inner raceway and outer raceway which is in contact with the rolling contact surface of the ball at one point is 0.505 to 0.560 times the diameter of the respective ball.

3. The rotation support device of claim 1, wherein the offset amount is up to 20% of the diameter of the pitch circle of the radial ball bearing.

4. The rotation support device of claim 1, wherein the offset amount is up to 10% of the diameter of the pitch circle of the radial ball bearing.

* * * * *

UNITED STATES PATENT AND TRADEMARK OFFICE
CERTIFICATE OF CORRECTION

PATENT NO. : 7,448,806 B2  Page 1 of 1
APPLICATION NO. : 10/920049
DATED : November 11, 2008
INVENTOR(S) : Hiroshi Ishiguro et al.

It is certified that error appears in the above-identified patent and that said Letters Patent is hereby corrected as shown below:

Title page item should read as follows:

-- (30)   Foreign Application Priority Data

Feb 20, 2002 (JP) .......................... 2002-042593 --

Signed and Sealed this

Twenty-fourth Day of March, 2009

JOHN DOLL
*Acting Director of the United States Patent and Trademark Office*